(12) United States Patent
Miglani et al.

(10) Patent No.: US 9,213,143 B1
(45) Date of Patent: Dec. 15, 2015

(54) MAKING CONNECTIONS THROUGH AN OPTICAL CIRCUIT SWITCH

(71) Applicant: CALIENT Technologies, Inc., Goleta, CA (US)

(72) Inventors: Jitender Miglani, Hollis, NH (US); Mchael Deacon, Ventura, CA (US); Vijayan Thattai, Goleta, CA (US); Sushma Sagaram, Camarillo, CA (US); Shifu Yuan, Camarillo, CA (US)

(73) Assignee: CALIENT Technologies, Inc., Goleta, CA (US)

( * ) Notice: Subject to any disclaimer, the term of this patent is extended or adjusted under 35 U.S.C. 154(b) by 0 days.

(21) Appl. No.: 14/322,021

(22) Filed: Jul. 2, 2014

(51) Int. Cl.
*G02B 6/35* (2006.01)

(52) U.S. Cl.
CPC ............ *G02B 6/3586* (2013.01); *G02B 6/3512* (2013.01); *G02B 6/3518* (2013.01); *G02B 6/3546* (2013.01)

(58) Field of Classification Search
None
See application file for complete search history.

(56) References Cited

U.S. PATENT DOCUMENTS

| | | | |
|---|---|---|---|
| 5,037,173 | A | 8/1991 | Sampsell et al. |
| 6,097,860 | A | 8/2000 | Laor |
| 6,411,751 | B1 | 6/2002 | Giles et al. |
| 6,456,751 | B1 | 9/2002 | Bowers et al. |
| 6,556,739 | B1 | 4/2003 | Kruglick et al. |
| 6,567,574 | B1 | 5/2003 | Ma et al. |
| 6,571,029 | B1 | 5/2003 | Kruglick et al. |
| 6,587,611 | B1 * | 7/2003 | Hunt ............................... 385/18 |
| 6,628,041 | B2 | 9/2003 | Lee et al. |
| 6,690,885 | B1 | 2/2004 | Aksyuk et al. |
| 6,728,016 | B1 | 4/2004 | Hunt et al. |
| 6,792,177 | B2 | 9/2004 | Welsh et al. |
| 6,798,992 | B1 | 9/2004 | Bishop et al. |
| 6,819,815 | B1 | 11/2004 | Corbalis et al. |
| 6,823,101 | B2 | 11/2004 | Gates, II et al. |
| 6,836,381 | B2 | 12/2004 | Giles et al. |
| 6,882,769 | B1 * | 4/2005 | Maitan ............................. 385/17 |
| 6,898,341 | B2 | 5/2005 | Huang et al. |
| 6,922,500 | B2 | 7/2005 | Huang et al. |
| 6,980,712 | B2 | 12/2005 | Huang et al. |
| 7,190,509 | B2 | 3/2007 | Bruns |
| 7,239,773 | B2 * | 7/2007 | Sakai et al. ...................... 385/18 |
| 7,398,019 | B2 * | 7/2008 | Tochio et al. ................... 398/56 |
| 7,676,125 | B2 * | 3/2010 | Zheng et al. .................... 385/18 |
| 8,682,117 | B1 | 3/2014 | Miglani et al. |
| 8,712,239 | B1 | 4/2014 | Miglani et al. |
| 2005/0286891 | A1 | 12/2005 | Sakai et al. |
| 2009/0323149 | A1 | 12/2009 | Mizukami et al. |
| 2010/0020378 | A1 | 1/2010 | Yamaguchi et al. |

* cited by examiner

*Primary Examiner* — Michelle R Connelly
(74) *Attorney, Agent, or Firm* — SoCal IP Law Group LLP; John E. Gunther; Steven C. Sereboff

(57) ABSTRACT

An optical circuit switch and method. A first mirror element rotates about orthogonal axes in response to first and second voltages applied respectively to first and second electrodes. A second mirror element rotates about orthogonal axes in response to third and fourth voltages applied respectively to the third and fourth electrodes. A controller may apply first through fourth voltages respectively to the first through fourth electrodes to make a connection between first and second ports. When an initial insertion loss of the connection does not exceed a predetermined threshold, the controller may conduct independent single-dimension searches to determine values for the first through fourth voltages that minimize the insertion loss. When the initial insertion loss exceeds the predetermined threshold, the controller may conduct a four-dimensional search to determine values for the first through fourth voltages that reduce the insertion loss to not exceed the predetermined threshold.

18 Claims, 11 Drawing Sheets

```
        9*          2*          3*
    8*          1*          4*
7*          6*          5*
        Input grid 9*          2*          3*
    8*          1*          4*
7*          6*          5*
        Output grid
```

1010 → Input grid
1020 → Output grid

| Search Pattern | | |
|---|---|---|
| In | Out | |
| 1 | 1 | Start |
| 2 | 1 | Add in 2 |
| 2 | 2 | Add out 2 |
| 1 | 2 | |
| 1 | 3 | Add out 3 |
| 2 | 3 | |
| 3 | 3 | Add in 3 |
| 3 | 2 | |
| 3 | 1 | |
| 4 | 1 | Add in 4 |
| 4 | 2 | |
| 4 | 3 | |
| 4 | 4 | Add out 4 |
| 3 | 4 | |
| 2 | 4 | |
| 1 | 4 | |
| 1 | 5 | Add out 5 |
| 2 | 5 | |
| 3 | 5 | |
| 4 | 5 | |
| 5 | 5 | Add in 5 |
| 5 | 4 | |
| 5 | 3 | |
| 5 | 2 | |
| 5 | 1 | |
| 6 | 1 | Add in 6 |
| 6 | 2 | |

| Search Pattern continued | | |
|---|---|---|
| In | Out | |
| 6 | 3 | |
| 6 | 4 | |
| 6 | 5 | |
| 6 | 6 | Add out 6 |
| 5 | 6 | |
| 4 | 6 | |
| 3 | 6 | |
| 2 | 6 | |
| 1 | 6 | |
| 1 | 7 | Add out 7 |
| 2 | 7 | |
| 3 | 7 | |
| 4 | 7 | |
| 5 | 7 | |
| 6 | 7 | |
| 7 | 7 | Add in 7 |
| 7 | 6 | |
| 7 | 5 | |
| 7 | 4 | |
| 7 | 3 | |
| 7 | 2 | |
| 7 | 1 | |
| 8 | 1 | Add in 8 |
| 8 | 2 | |
| 8 | 3 | |
| 8 | 4 | |
| 8 | 5 | |

| Search Pattern continued | | |
|---|---|---|
| In | Out | |
| 8 | 6 | |
| 8 | 7 | |
| 8 | 8 | Add out 8 |
| 7 | 8 | |
| 6 | 8 | |
| 5 | 8 | |
| 4 | 8 | |
| 3 | 8 | |
| 2 | 8 | |
| 1 | 8 | |
| 1 | 9 | Add out 9 |
| 2 | 9 | |
| 3 | 9 | |
| 4 | 9 | |
| 5 | 9 | |
| 6 | 9 | |
| 7 | 9 | |
| 8 | 9 | |
| 9 | 9 | Add in 9 |
| 9 | 8 | |
| 9 | 7 | |
| 9 | 6 | |
| 9 | 5 | |
| 9 | 4 | |
| 9 | 3 | |
| 9 | 2 | |
| 9 | 1 | |

FIG. 10

© 2014 Calient Technologies, Inc.

US 9,213,143 B1

MAKING CONNECTIONS THROUGH AN OPTICAL CIRCUIT SWITCH

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to optical communications networks and more particularly to optical circuit switches using MEMS (micro-electromechanical system) mirror arrays.

2. Description of the Related Art

Communications networks commonly contain a mesh of transmission paths which intersect at hubs or nodes. At least some of the nodes may include a switching device that receives data or information arriving at the node and retransmits the information along appropriate outgoing paths.

Optical fiber links are commonly used to provide high bandwidth transmission paths between nodes. Such optical fiber links form the backbone of wide area networks such as the Internet. Optical fiber links are also applied in high bandwidth local area networks which may be used, for example, to connect server racks in large data centers or to connect processors in high performance computers.

An optical circuit switch is a switching device that forms connections between pairs of optical fiber communications paths. A typical optical circuit switch may have a plurality of ports and be capable of selectively connecting any port to any other port in pairs. Since an optical circuit switch does not convert information flowing over the optical fiber communication paths to electrical signals, the bandwidth of an optical circuit switch is essentially the same as the bandwidth of the optical communications paths. Further, since an optical circuit switch does not convert information into electrical signals, the power consumption of an optical circuit switch may be substantially lower than a comparable conventional (i.e. electronic) switch.

DESCRIPTION OF THE DRAWINGS

FIG. 10 is a graphical representation and tabular listing of another exemplary search pattern.

Throughout this description, elements appearing in figures are assigned three-digit reference designators, where the most significant digit is the figure number where the element is introduced and the two least significant digits are specific to the element. An element that is not described in conjunction with a figure may be presumed to have the same characteristics and function as a previously-described element having the same reference designator.

DETAILED DESCRIPTION

Description of Apparatus

Figure 1:
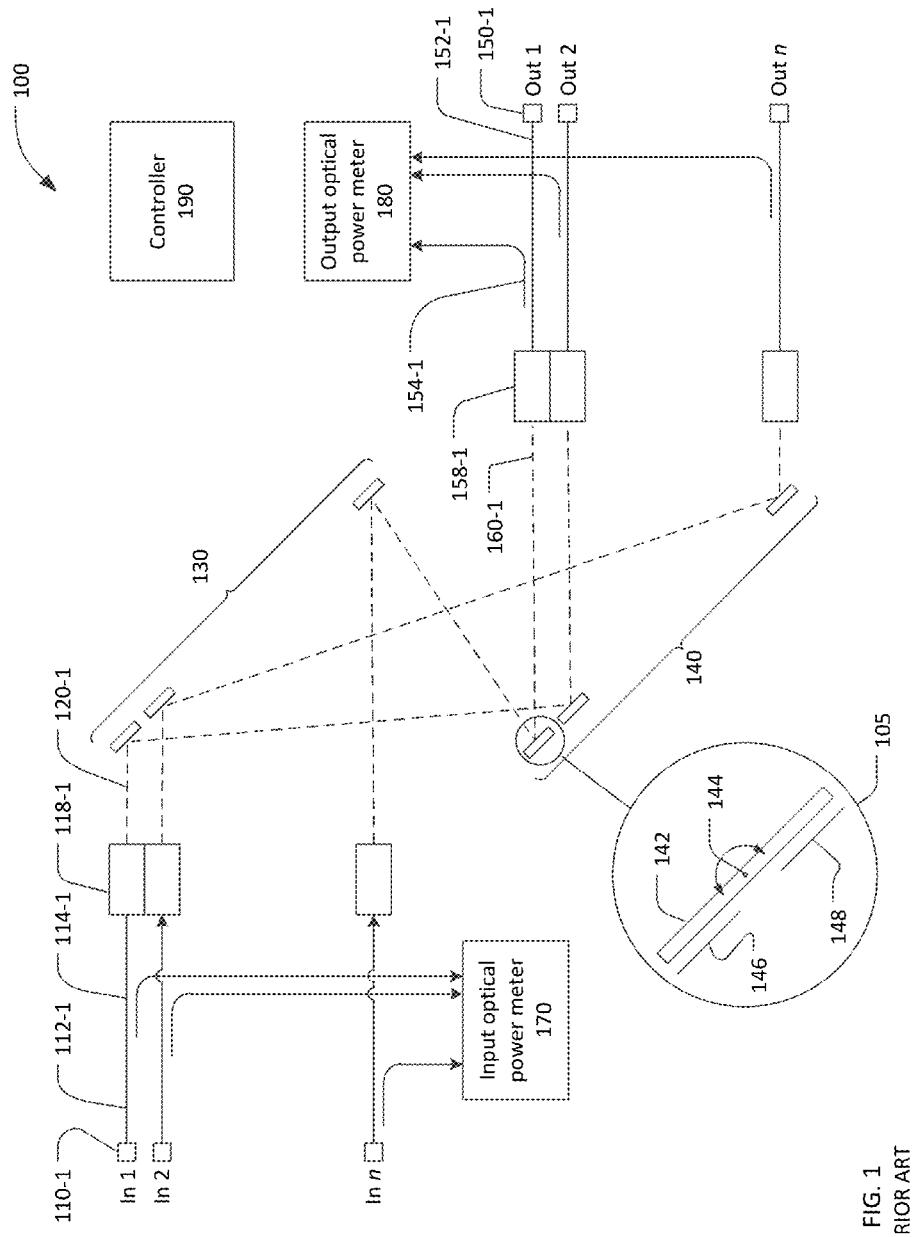
FIG. 1 is an optical schematic diagram of an optical circuit switch.

Referring now to FIG. 1, an exemplary optical circuit switch 100 may be configured to connect a group of n inputs (where n is an integer greater than 1), labeled In 1 to In n, to a group of n outputs, labeled Out 1 to Out n. More specifically, the optical circuit switch 100 may selectively connect up to n pairs of inputs and outputs.

Each of the inputs In 1 to In n may include a connector (of which only the connector 110-1 is identified) to receive an input optical signal from a optical fiber cable (not shown) external to the optical circuit switch. Each connector may be coupled by a respective optical fiber (of which only optical fiber 112-1 is identified) to a respective tap coupler (of which only tap coupler 114-1 is identified). Each tap coupler may extract an input sample portion, for example 1% to 11%, of the input optical signal from the respective optical fiber. Each input sample portion may be directed to an input optical power meter 170. The remainder of the input optical signals, other than the input sample portions, may be conveyed by respective optical fibers to respective collimator lenses (of which only collimator lens 118-1 is identified). Each collimator lens may convert the input optical signal from the respective optical fiber into an input optical beam (of which only input optical beam 120-1 is identified) in free space. While lenses, such as the lens 118-1 are commonly referred to as "collimator" lenses, the input optical beam 120-1 will not be perfectly collimated due to the finite diameter of the light exiting the end of the input optical fiber 112-1. Free space optical beams are shown in FIG. 1 as dashed lines.

Each input optical beam, such as input optical beam 120-1, may be directed onto a input mirror array 130. The input mirror array 130 may include n mirrors with a one-to-one correspondence between input optical beams and mirrors, such that each input optical beam is directed onto a respective mirror. To improve the manufacturing yield of the input mirror array, the input mirror array 130 may include more than n mirrors, in which case the n input optical beams may be directed to a subset of n mirrors that are known to be fully functional. Since each of the n input optical beams originates from a specific port and is directed onto a specific mirror, each port may be described as "uniquely associated" with a corresponding mirror. In this patent, "uniquely associated" means a one-to-one correspondence. To take advantage of the available fully functional mirrors, the associations between ports and mirrors may be different in different optical circuit switches Each mirror on the input mirror array 130 may reflect the respective input optical beam to a selected mirror of a output mirror array 140. The mirrors of the output mirror array 140 may reflect the incident beam to form a respective output optical beam (of which only output optical beam 160-1 is identified). Each output optical beam may be directed to a corresponding focusing lens (of which only focusing lens 158-1 is identified). Each focusing lens may focus the respective output optical beam into an output optical signal in a respective optical fiber. Each output optical signal may be conveyed to a respective output tap coupler (of which only output tap coupler 154-1 is identified). Each output tap coupler may direct a sample portion (for example 1% to 11%) of the respective output optical signal to an output optical power meter 180. The remainder of each output optical signal, other than the respective sample portion, may be conveyed by a respective output fiber (of which only output fiber 152-1 is identified) to a respective output connector (of which only output connector 150-1 is identified).

The input optical power meter 170 and the output optical power meter 180 may be a common module. The input optical power meter 170 and the output optical power meter 180 may measure the optical power in each of the input sample portions and output sample portions, respectively. Each of the input optical power meter 170 and the output optical power meter 180 may include an optical power detector for each sample portion. Alternatively, each of the input optical power meter 170 and the output optical power meter 180 may time-multiplex a single detector or an array of detectors such that each detector measures the optical power of sequence of sample portions. For example, each of the input optical power meter 170 and the output optical power meter 180 may use a scanning mirror to direct sample portions to a single detector or an array of detectors as described in U.S. Pat. No. 7,676,125.

Sample portions may be extracted from the input optical beams, such as input optical beam 120-1, and/or the output optical beams, such as output optical beam 160-1, using one or more free space sampling optical elements. For example, sample portions may be extracted as described in U.S. Pat. No. 6,597,825 or U.S. Pat. No. 6,668,118. Input tap couplers, such as input tap coupler 114-1 and/or output tap couplers, such as output tap coupler 154-1, may not be present when free-space sampling optical elements are used to extract sample portions.

The optical circuit switch 100 may include a controller 190. The controller 190 may control the mirror elements in the input mirror array 130 and the output mirror array 140 to make desired optical connections between the inputs In 1 to In n and the outputs Out 1 to Out n. For example, as shown in FIG. 1, input In 1 is connected to output Out 2, input In 2 is connected to output Out n, and input In n is connected to output Out 1. The controller 190 will be discussed in greater detail subsequently.

The detail view 105 shows a simplified schematic diagram of a mirror element from either the input mirror array 130 or the output mirror array 140. A reflective mirror element 142 is supported by a pair of torsion bars, of which only a first torsion bar 144 is visible. The second torsion bar is located on the far side of the mirror element 142 and axially aligned with the first torsion bar 144. The mirror element 142 may rotate about the axis of the torsions bars, with the torsion bars providing a spring force tending to return the mirror element 142 to a default position. The mirror element 142 may be coupled to a first electrode 146 and a second electrode 148. The mirror element 142 may be rotated by electrostatic attraction between the mirror element and either the first electrode 146 or the second electrode 148.

For example, applying a voltage between the first electrode 146 and the mirror element 142 will create an attraction between the mirror element and the first electrode, causing the mirror element to rotate in a counter-clockwise direction. The mirror will rotate until the return force of the torsion bars is equal to the force of the electrostatic attraction. The angular rotation of the mirror element 142 may be approximately proportional to the square of the voltage between the first electrode 146 and the mirror element 142. Similarly, applying a voltage between the second electrode 148 and the mirror element 142 will cause the mirror to rotate in a clockwise direction. The first electrode 146 and the second electrode 148 may be "dedicated" to the mirror element 142, which is to say the only function of the electrodes 146 and 148 is to rotate the mirror element 142 and the voltages applied to the electrodes 146 and 148 have no effect on any mirror element other than the mirror element 142.

In the simplified example of FIG. 1, the mirror element 142 rotates about a single axis defined by the torsion bars 144. Either or both of the input mirror array 130 and the output mirror array 140 may include mirrors configured to independently rotate about two orthogonal axes. In this case, each mirror element may be coupled to a first pair of electrodes to cause clockwise and counter-clockwise rotation about a first axis and a second pair of electrodes to cause clockwise and counter-clockwise rotation about a second axis orthogonal to the first axis. The structure of a mirror array and the associated electrodes may be substantially more complex than that shown in the simplified schematic detail view 105. For example, U.S. Pat. No. 6,628,041 describes a MEMS mirror array having two-axis mirror motion and comb actuators.

Figure 2:
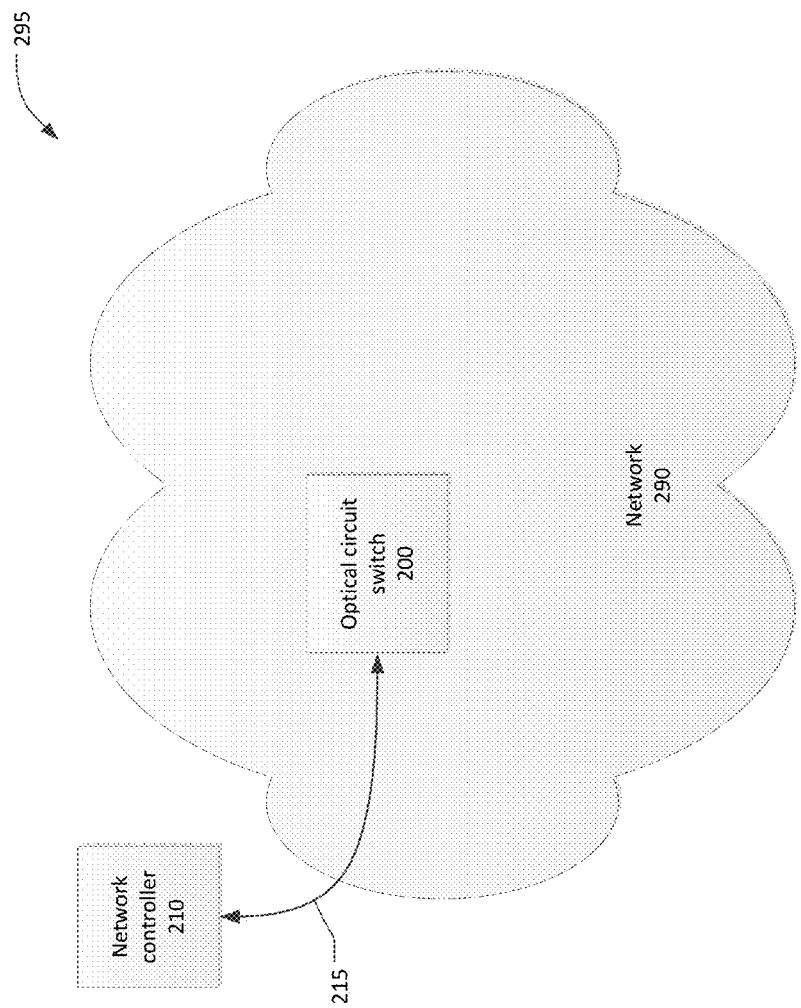
FIG. 2 is a block diagram of an environment for an optical circuit switch.

Referring now to FIG. 2, an environment 295 for the application of an optical circuit switch 200 may include a network 290 and a network controller 210. The optical circuit switch 200 may be the optical circuit switch 100 or may be a compound optical circuit switch including multiple copies of the optical circuit switch 100. When the optical circuit switch 200 is a compound optical circuit switch, the multiple copies of the optical circuit switch 100 may be collocated or distributed. The optical circuit switch 200 may be disposed within the network 290 and may function to switch optical connections between other nodes (not shown) within the network 290. The network 290 may be, for example, a wide area network, a local area network, a storage area network, a private network within a data center or computer cluster, and may be or include the Internet. While the connections switched by the optical circuit switch 200 are optical, other connections within the network 290 may be wired and/or wireless.

The network controller 210 may be a computing device that provides a graphic user interface or a command line interface for a network operator to enter connection commands (i.e. commands to make or break one or more optical connections) for the optical circuit switch 200. The network controller 210 may be a computing device running network management software, in which case connection commands for the optical circuit switch 200 may be generated automatically by the network controller 210.

A communications link 215 between the optical circuit switch 200 and the network controller 210 may be in-band, which is to say the communications link 215 may be a path within the network 290. In this case, the optical circuit switch may have a wired, wireless, or optical connection to the network in addition to the optical connections being switched. The communications link 215 may be out-of-band, which is to say the communications link 215 may be a dedicated connection or a connection via a command network independent from the network 290. A configuration in which the network controller 210 executes network management software to automatically provide connection commands to the optical circuit switch 200 via an out-of-band communications link 215 is an example of what is commonly called a "software defined network".

Figure 3:
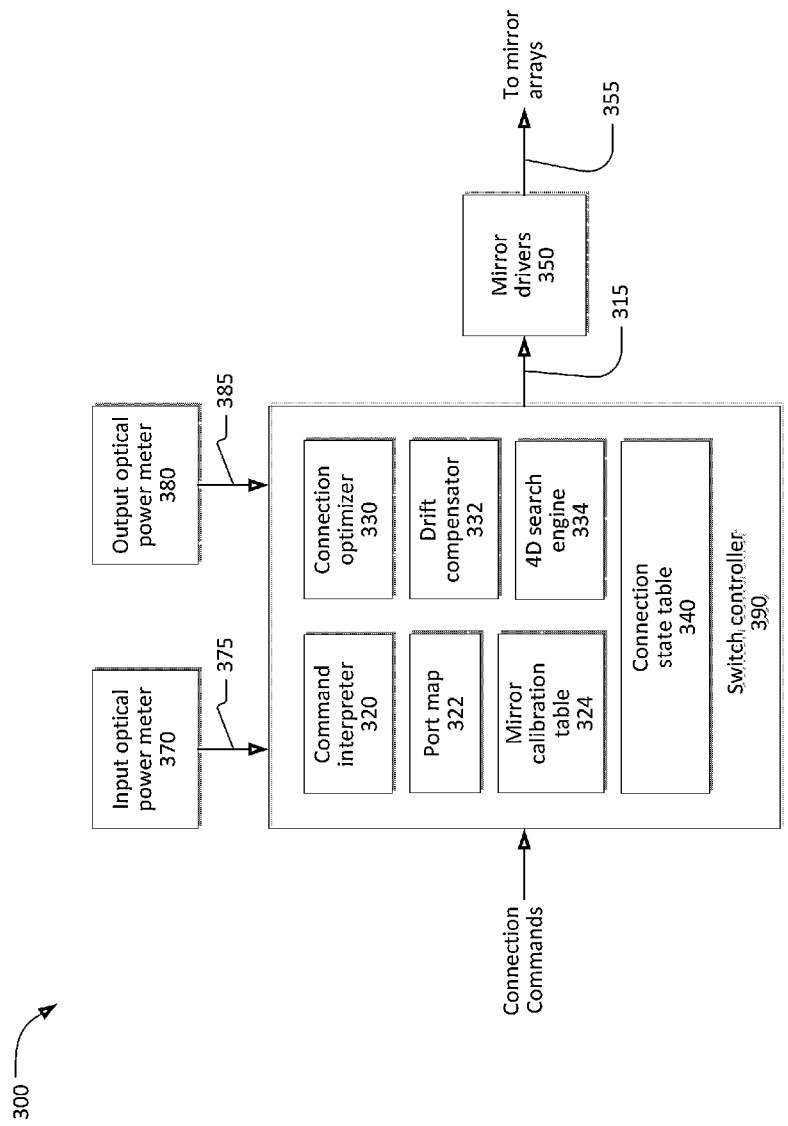
FIG. 3 is a block diagram of an optical circuit switch.

FIG. 3 is a high-level block diagram of the control and mirror driver portions of an optical circuit switch 300, which may be the optical circuit switch 100. The optical circuit switch 300 may include a switch controller 390, an input optical power meter 370, an output optical power meter 380, and a plurality of mirror driver circuits 350. The optical circuit switch 300 may include one mirror driver circuit 350 for each mirror in two mirror arrays if the individual mirror elements are rotatable about a single axis. The optical circuit switch 300 may include two mirror driver circuits 350 for each mirror in the mirror arrays if the individual mirror elements are rotatable about two orthogonal axes. Each mirror driver circuit 350 may have, for example, two selectable outputs to drive one or the other of a pair of electrodes, as described in pending patent application Ser. No. 13/787,621.

The switch controller 390 may include a command interpreter 320, a port map 322, a mirror calibration table 324, a connection optimizer 330, a drift compensator 332, and a 4D search engine 334 which may jointly maintain a connection state table 340. The switch controller 390 may receive connection commands from an external source such as the network controller 210. The switch controller 390 may receive connection commands from some other source or in some other manner.

The switch controller 390 may receive data from the input optical power meter 370 and the output optical power meter 380 indicating the power levels at the inputs and the outputs of the optical circuit switch 300, respectively. The switch controller 390 may determine or calculate an insertion loss for each connection through the optical circuit switch based on the data from the input and output optical power meters.

The command interpreter 320 may be responsive to a set of connection commands received by the switch controller 390. The set of connection commands may include, for example "Break a-b" and "Make a-b". These commands may respectively instruct the optical circuit switch 300 to either break an existing connection between ports a and b (where a and b are identifiers that identify an input port and an output port, respectively), or to make a new connection between ports a and b. Each identifier a and b may be an integer port number, a character string, or some other data that uniquely identifies the respective ports. The set of connection commands may include a mass connection command, which may list multiple connections to be made. The mass connection command may be used, for example, when the optical circuit switch is initially integrated into a network or when substantial reconfiguration of the network or data center is required.

The command interpreter 320 may include or have access to the port map 322. As previously described, to allow the use of mirror arrays with a small number of nonoperational mirror elements, the number of mirror elements in each mirror array may be larger than the number of inputs or outputs. Each input and output may be coupled to a known operational mirror element in the respective mirror array. The port map 322 may be a table containing data relating each input to a mirror element in a input mirror array, and data relating each output to a mirror element in a output mirror array. The data in the port map 322 may be specific to the particular input and output mirror arrays used in the optical circuit switch 300.

There may be some performance variation from mirror element to mirror element and/or from mirror array to mirror array. In particular, there may be some variation in the mirror element rotation angle versus applied voltage characteristics within and between mirror arrays. The command interpreter 320 may include or have access to the mirror calibration table 324 which contains data describing the performance of each mirror element. For example, the mirror calibration table 324 may store the rotation angle versus voltage characteristic of each mirror element. The mirror calibration table 324 may store, for all possible pairs of input and output mirror elements, a set of voltages that, when applied to the appropriate electrodes, will cause the mirror elements to rotate to make the desired connection. The data in the mirror calibration table 324 may be specific to the particular mirror arrays used in the optical circuit switch 300. The data in the mirror calibration table 324 may be derived, for example, from the results of tests performed on the particular mirror arrays used in the optical circuit switch 300.

The data stored in the mirror calibration table 324 may indicate nominal voltages required to initially make desired connections through the optical circuit switch 300. However, once voltages are applied to electrodes associated with a pair of input and output mirror elements to initially make a connection, the positions of the mirror elements may drift over time. The result of mirror element drift may be failure or degradation (e.g. increased insertion loss) of the connection. The mirror arrays used in the optical circuit switch 300 may be fabricated by chemical micromachining of a silicon substrate. For example, each mirror element may consist of a reflective coating on a silicon slab that is connected to the silicon substrate by narrow silicon elements that function as torsion bars. Each silicon mirror slab may be free to rotate about the axis or axes defined by the torsion bars. Mirror element drift may be due to mechanical strain or stress relief of the torsion bars over time. Further, all or portions of the silicon surfaces of the mirror array may be coated with SiO2 or some other dielectric. Electric charge trapped at defects in the insulators layers may contribute to mirror element drift over time. Other causes may also contribute to mirror element drift.

When a new connection in made through the optical circuit switch, the command interpreter 320 may first determine the mirror elements to be used to make the connection from the port map 322, and then retrieve the nominal voltages to be applied to the mirror arrays from the mirror calibration table 324. The retrieved nominal voltages may be applied to the appropriate electrodes of the mirror arrays to attempt to make the new connection. After the nominal voltages are applied, an insertion loss of the new connection may be determined based on data from the input and output optical power meters 370, 380. If the insertion loss of the connection is less than a predetermined threshold, the connection is presumed to be successful. In this case, the connection optimizer 330 assumes control of the connection.

The connection optimizer 330 may determine the insertion loss of each active optical connection (i.e. each optical connection where light is present) from the respective input and output power levels. The connection optimizer 330 may periodically adjust the positions of some or all of the mirror elements to minimize the insertion loss of each optical connection. For example, to optimize a connection, the connection optimizer 330 may make incremental changes in the position of one of the mirror elements used in the connection and observe the resulting effect on insertion loss. The optimum positions of the mirror elements may then be found using a hill climbing algorithm or a similar local area search algorithm. The position of each mirror element may be optimized periodically. The time interval between successive optimizations of each mirror element may be short (on the order of seconds) compared to the time constant of the mirror element drift (on the order of hours). Periodic optimization of the position of each mirror element may automatically compensate for mirror element drift.

A significant amount of mirror element drift may accumulate when a connection is made and sustained for a long period of time. When such a connection is broken, the accumulated mirror element drift will gradually decay to zero. However, in some case, a new connection may be attempted using a mirror element before the accumulated drift of that mirror element has decayed to zero. In this situation, the remaining residual drift of the mirror element will cause an error in the mirror element position that may prevent making the new connection. The switch controller may include a drift compensator 332 to estimate an amount of residual drift of each mirror element previously used in a connection. The estimate of residual drift may be combined with the nominal voltage values provided by the mirror calibration table 324 to define corrected voltage values. The corrected voltage values may be applied to the electrodes associated with a drifted mirror element to compensate, at least in part, for the residual drift. The use of a drift compensator to compensate for MEMS mirror element drift is described in pending patent application Ser. No. 13/958,889.

In some cases, the application of corrected voltages, or nominal voltages when drift compensation is not used, may not result in a connection between particular input and output ports. Failure to make a connection may be caused, for example, by an error in the mirror calibration table, by unexpected residual mirror element drift, by a permanent change in mirror element characteristics, or another cause. In this situation, the 4D (4 dimensional) search engine 334 may assume control of the mirrors element used in the failed connection. The 4D search engine may then conduct a search across four dimensions (2 rotation axes for each of two mirror elements) to locate a set of voltages that cause the desired connection to be made. Details of the operation of the 4D search engine 334 will be provided in the subsequent Description of Processes.

The command interpreter 320, the connection optimizer 330, the drift compensator 332, and the 4D search engine 334 may jointly maintain and share the connection state table 340. The connection state table 340 may include data indicative of the state or status of each port of the optical circuit switch 300. Data included in the connection state table 340 for each port may include a first flag indicating if the respective port is available or committed to a connection, and a second flag indicating if the connection has actually been made. The connection state table 340 may include, for input ports, a third flag indicating is light is present at the respective input. For each port that is committed to a connection, the connection state table 340 may also include the identity of the port at the other end of the connection, the mirror element associated with the port, the voltages presently applied to the electrodes associated with the mirror element, an estimate of the residual drift of the mirror element associated with the port, and temporal data such as when the connection was first made and when the position of the mirror element was most recently optimized.

The functional elements of the switch controller 390 may be implemented by a collection of hardware, which may be augmented by firmware and/or software. The collection of hardware may include analog circuits, digital circuits, and one or more processors such as micro controllers, microprocessors, and/or digital signal processors. All or portions of the functional elements of the switch controller 390 may be implemented by a processor executing stored software instructions. All or portions of the functional elements of the switch controller 390 may be implemented in one or more application specific integrated circuits (ASICs) and/or one or more programmable circuit devices such as programmable logic arrays and field programmable gate arrays (FPGAs).

Configuration data for programming a programmable circuit device may be stored in a machine readable storage medium and used to configure a programmable circuit device upon power-up of a test system. Software instruction for execution by a processor may also be stored in a machine readable storage medium. In this patent, the term "machine readable storage medium" means a physical medium for storing digital data. Examples of machine readable storage media include optical discs such as CD-ROM, CD-RW, and DVD discs; magnetic medium such as hard and flexible magnetic discs and magnetic tape; and nonvolatile semiconductor devices such as read-only and flash memories. The term "machine readable storage medium" does not encompass transitory media such as signals and waveforms.

The depiction of the switch controller 390 as a plurality of functional elements does not imply a corresponding physical division of the hardware constituting the scan controller. Any functional element may be divided between two or more modules, circuit cards, programmable circuit devices, ASICs, or other circuit devices. All or portions of two or more functional element may be collocated within a common programmable circuit device, ASIC, or other circuit device.

Description of Processes

Figure 4:
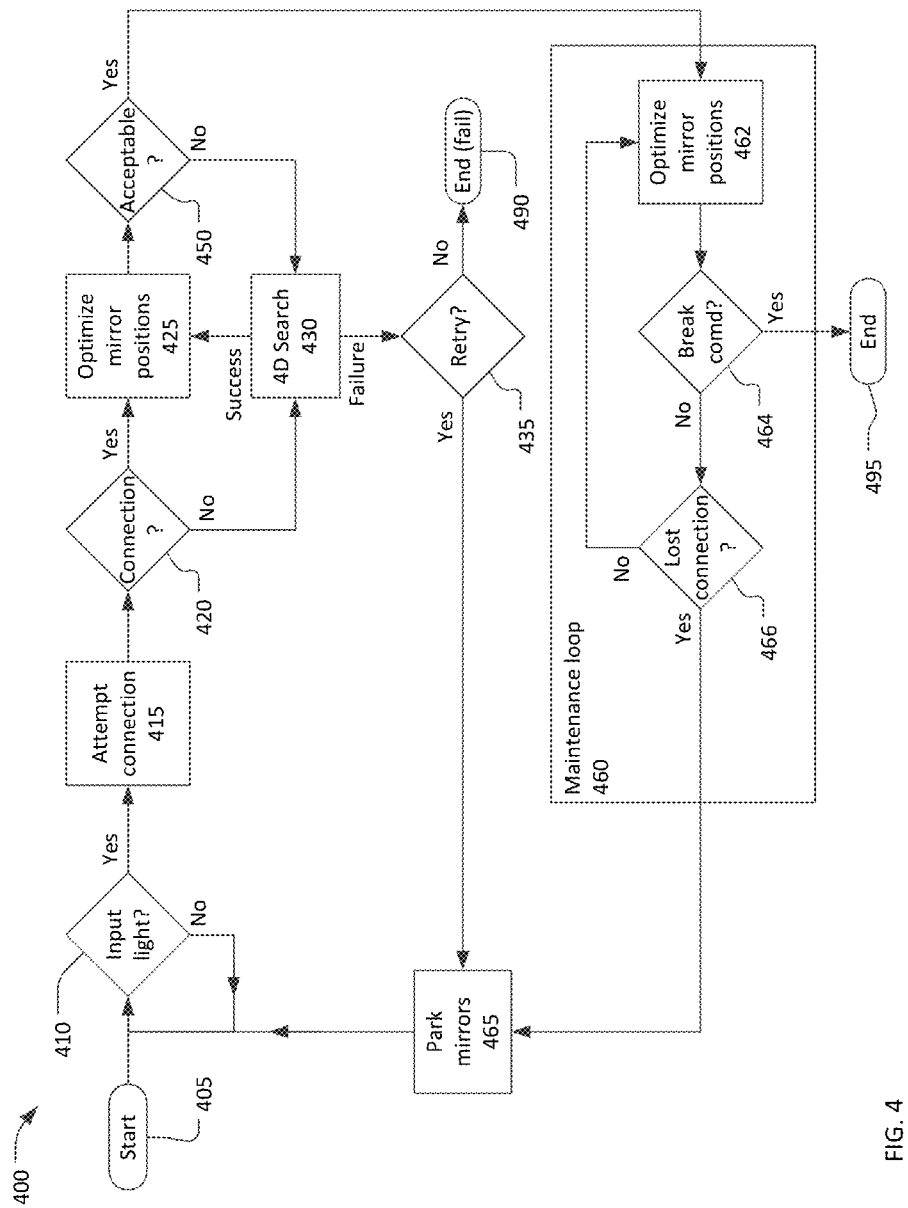
FIG. 4 is a flow chart of a process for making a connection through an optical circuit switch.

FIG. 4 is a flow chart of a process 400 for making a connection through an optical circuit switch such as the optical circuit switches 100 and 300. The process 400 may start at 405 when a connection command is received by a switch controller such as the switch controller 390. The process 400 may end at 490 if the desired connection cannot be made, or may end at 495 if the connection is made and subsequently broken.

Multiple instantiations of the process 400 may proceed sequentially and/or concurrently to make multiple connections, involving multiple mirrors, through the compound optical circuit switch. Note that two instantiations of the process 400 are required to make both directions of a full-duplex connection.

As previously described, a connection optimizer 330 and a drift compensator 332 with the optical circuit switch may rely upon measurements of the input and output optical power of each connection. Dark connections, or connections without any input light, cannot be optimized and the drift of mirror elements involved in dark connections cannot be determined or compensated. Thus, after a connection command is received at 405, a determination may be made at 410 whether or not light is present at the input port identified in the received connection command. For example, the input optical power ("Pin") at the input port may be measured by the input optical power meter 370 and compared to a threshold minimum optical power ("$Pin_{min}$"). $Pin_{min}$ may be, for example, equal to a minimum anticipated input optical signal. When $Pin \geq Pin_{min}$ a determination may be made ("yes" at 410) that input light is present, and the process may continue to 415. When $Pin < Pin_{min}$ a determination may be made ("no" at 410) that input light is not present, and the process may idle at 410 until input light is provided.

At 415, an attempt to make the requested connection may be made. First, the mirror elements associated with the ports specified in the connection command may be identified. For example, the mirror elements may be identified by consulting the port map 322. Nominal voltages to be applied to electrodes associated with the identified mirror elements may then be retrieved from the mirror calibration. The drift compensator 332 may then adjust the nominal voltages as required to compensate for residual drift of the identified mirror elements to provide corrected voltages. The corrected voltages may then be applied to the electrodes associated with the identified mirror elements to attempt to make the requested connection.

At 420, a determination may be made whether or not a connection has resulted from the action at 415. For example, the output optical power ("Pout") at the output port may be measured by the output optical power meter 380 and compared to a threshold minimum output optical power ("$Pout_{min}$"). In order to optimize a connection through the optical circuit switch, the output optical power meter must be able to detect small changes in Pout. To allow detection of small changes, Pout needs to be sufficiently above the noise floor, or the bottom of the dynamic range, of the output optical power meter. Thus $Pout_{min}$ may be set to equal the noise floor of the output optical power meter plus a margin of, for example, 2 or 3 dB. When Pout≥$Pout_{min}$ a determination may be made ("yes" at 420) that a connection has been made, and the process may continue to 425. When Pout<$Pout_{min}$ a determination may be made ("no" at 420) that a connection has not been made, and the process may continue at 430.

Alternatively, the output optical power Pout at the output port may be measured by the output optical power meter 380 and the insertion loss IL of the connection may be calculated. The insertion loss ("IL") may be compared to a threshold insertion loss ("$IL_{th}$"). The threshold insertion loss may be set based on the minimum expected input signal power and the noise floor of the output monitoring module. For example, if the minimum expected optical signal power is −20 dBm and the noise floor of the output optical power meter is −32 dBm, the insertion loss threshold may be set to 10 dB. When IL≤$IL_{th}$ a determination may be made ("yes" at 420) that a connection has been made, and the process may continue to 425. When IL>$IL_{th}$ a determination may be made ("no" at 420) that a connection has not been made, and the process may continue at 430.

When a determination is made at 420 that a connection has been made, the connection may be optimized at 425 by a connection optimizer such as the connection optimizer 330. The connection optimizer may optimize the connection be performing separate searches on each of four axes (two rotation axes for each of two mirrors) using a hill-climbing algorithm or other local area search algorithm. The connection optimizer may optimize each axis in sequence and repeat the sequence two or more times.

After completion of the connection optimization at 425, a determination may be made at 450 whether or not the connection is acceptable. For example, the input optical power Pin and the output optical power Pout may be measured and the insertion loss of the connection may be calculated and compared to a maximum acceptable insertion loss ("$IL_{max}$"). When IL≤$IL_{max}$ a determination may be made ("yes" at 450) that an acceptable connection has been made, and the process may continue to 460. When IL>$IL_{max}$ a determination may be made ("no" at 450) that the connection is not acceptable, and the process may return to 430.

When a determination is made at 450 that an acceptable connection has been made, the process 400 may enter a connection maintenance loop at 460. At 462, the connection optimizer may optimize the mirror element positions as previously described with respect to 425. Optimizing the mirror element positions at 462 may be performed periodically to compensate for any mirror element drift that may occur. Optimizing the mirror element positions at 462 may be performed repeatedly until either a determination is made at 464 that a command to break the connection has been received, or until a determination is made at 466 that the connection has been lost.

When a determination is made at 464 that a break command has been received ("yes" at 464), the mirror elements may be placed in respective parked positions and the process 400 may end at 495.

A connection through the optical circuit switch can be lost if the input light is removed from the connection. In this case, the ongoing drift of the mirror elements used in making the connection cannot be compensated. If the input light is removed for a sufficiently long time period, the cumulative uncompensated mirror element drift may result in the connection being lost. A connection may also be lost due to a failure or error within the optical circuit switch. Additionally, in extraordinary circumstances, the connection made at 415 may be a false connection between the desired output port and an incorrect input port. This can occur if the mirror element associated with the incorrect input port is in a position that reflects light from the incorrect input port to the mirror element associated with the desired output port. A false connection will be broken when the mirror associated with the incorrect input port is either used to make a different connection or is placed in its parked position. Thus, false connections are usually temporary.

As previously described, a the positions of mirror elements used in making each connection are periodically optimized to minimize the insertion loss of the connection, which is to say to maximize the output power form the connection. This optimization can only be performed when the output power from the connection is at a usable level. At 466, a determination may be made whether or not the connection has been lost. The connection may be considered as lost if the output power falls below a threshold level, which may be the threshold minimum output optical power $Pout_{min}$ from 415. The connection may be considered as lost if the output power falls below a threshold level for more than a predetermined time interval. The connection may be considered as lost at 466 if the insertion loss of the connection increases by more than a predetermined amount or if the output power of the connection decreases by more than a predetermined amount.

When a determination is made at 466 that the connection has been lost ("yes" at 466), the mirror elements may be returned to their respective parked positions, and the process 400 may return to 410 to either wait for input light or to attempt to remake the connection.

Although the actions 462, 464, and 466 within the maintenance loop 460 are shown as sequential for ease of discussion, optimizing the mirror element positions at 462 may be performed periodically, and the actions at 464 and 466 may be performed continuously and simultaneously.

When a determination is made at 420 that a connection has not been made ("no" at 420) or when a determination is made at 450 that a connection is not acceptable ("no" at 450), a 4D search may be performed at 430. The 4D search process will be described in more detail subsequently. The 4D search 430 may end in either success (i.e. establish a connection) or failure (i.e. not find a connection). When the 4D search 430 results in a connection ("success" at 430), the process 400 may continue at 425. When the 4D search 430 does not find a connection ("failure" at 430), the process 400 may continue at 435.

At 435, a determination may be made whether or not to retry to make the requested connection. For example, the process 400 may be defined to never retry, to retry a predetermined number of times, or to retry repeatedly without limit until the connection command is cancelled or a connection is made. When a determination made that a retry will not be attempted ("no" at 435), the mirror elements may be placed in their respective parked positions and the process 400 may end in failure at 490. When a determination is made that a retry will be attempted ("yes" at 435), the mirror elements may be placed in their respective parked positions at 465 and the process 400 may repeat from 410.

Figure 5:
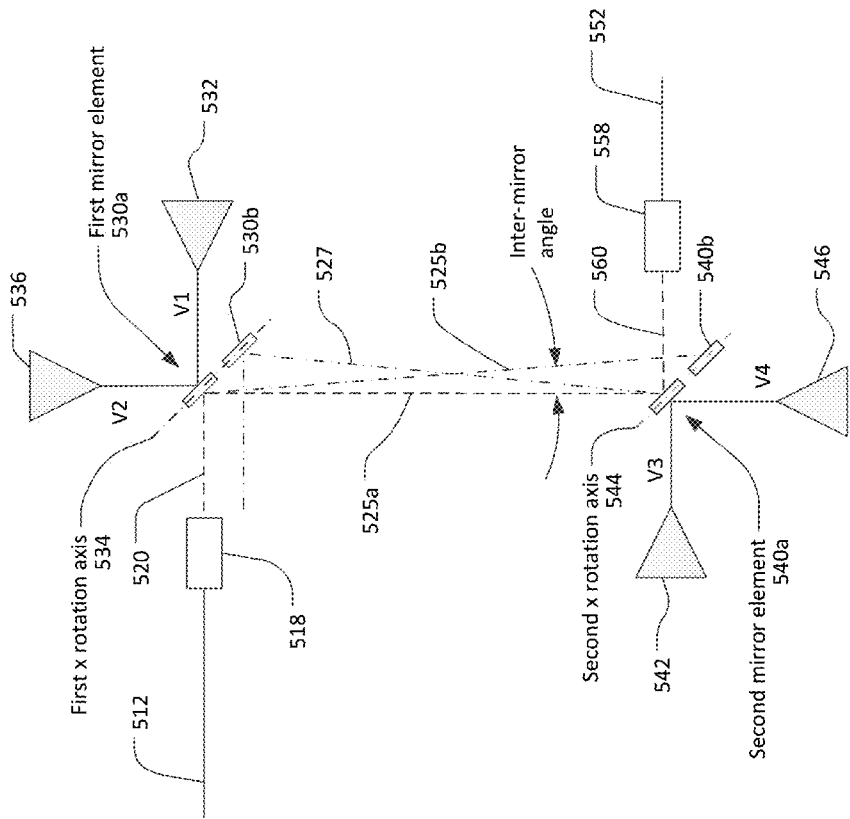
FIG. 5 is an optical schematic diagram of a portion of an optical circuit switch.

FIG. 5 is an optical schematic diagram of a portion of an optical circuit switch such as the optical circuit switch 100. An input signal is conveyed through an input optical fiber 512 to a lens 518 which converts the input signal into an input beam 520. The input beam 520 may have a Gaussian energy profile. The input beam 520 may have a finite diameter at the lens 518 and may be slightly converging rather than precisely collimated.

The input beam 520 may reflect from a first mirror element 530a which may be part of an input mirror array, such as the input mirror array 130, including a plurality of input mirror elements. The first mirror element 530a may be independently rotatable about an x-axis 534 and a y-axis (not identified) orthogonal to the plane of the drawing. A rotation angle about the x-axis 534 may be controlled by a first voltage V1 provided by a driver circuit 532 and applied to an electrode (not shown) coupled to the first mirror element 530a. Similarly, a rotation angle about the y-axis may be controlled by a second voltage V2 provided by a driver circuit 536 and applied to an electrode (not shown) coupled to the first mirror element 530a.

The beam 525a (dashed line) reflected from the first mirror element 530a may be directed to a second mirror element 540a which may be part of an output mirror array, such as the output mirror array 140, including a plurality of output mirror elements. The second mirror element 540a may be independently rotatable about an x-axis 544 and a y-axis (not identified) orthogonal to the plane of the drawing. A rotation angle about the x-axis 544 may be controlled by a third voltage V3 provided by a driver circuit 542 and applied to an electrode (not shown) coupled to the second mirror element 540a. Similarly, a rotation angle about the y-axis may be controlled by a fourth voltage V4 provided by a driver circuit 546 and applied to an electrode (not shown) coupled to the second mirror element 540a.

The beam 560 reflected from the second mirror element 540a may be directed to a lens 558 that converts the beam 560 into an output signal in an output optical fiber 552. In order to form an efficient optical connection, an image of an exit face of the input optical fiber 512 must be precisely imaged onto an entrance face of the output optical fiber 552. Further, the entire diameter of the beams 520 and 525 must reflect from the first mirror element 530a and the second mirror element 540b, respectively, without vignetting. Any error in the rotation of either the first mirror element 530a or the second mirror element 540a may result in increased insertion loss of the optical connection or, if the error is sufficient, failure to form the optical connection. For the purpose of discussion, mirror element rotation errors may be quantified in terms of an "inter-mirror angle", which is the angle between the optical beam 525a directed from the first mirror element 530a to the second mirror element 540a and an erroneous beam 525b (dash-dot line) directed from the first mirror element 530a to an incorrect output mirror element 540b adjacent to the second mirror element 540a.

As previously described, a false connection between the desired output port and an incorrect input port can occur in some circumstances. In a false connection, an optical beam 527 (dash-dot-dot line) from an incorrect port (i.e. a port other than the port associated with the first mirror element 530a) is reflected from an associated input mirror element 530b to the second mirror element 540a. The second mirror element 540a may reflect the optical beam 527 into the lens 558. The lens 558 may convert the beam 527 into a false output signal in the output optical fiber 552.

When an attempt to make a connection through an optical circuit switch has been unsuccessful, one or both of the input mirror element and the output mirror element may be rotated to an incorrect angle on one or both of the respect x and y rotation axes. In this event, a 4D search may be performed. For example, a 4D search may be initiated after either 420 or 450 in the process 400. The 4D search may be performed by progressively changing the first, second, third, and fourth voltages (V1, V2, V3, V4 respectively) applied by the driver circuits 532, 536, 542, 546 to the respective electrodes coupled to the first mirror element 530a and the second mirror element 540a. The drive voltages may be varied to cause the mirror elements 530a, 540a to rotate in predetermined angular steps about the respective x and y rotation axes. A large number of different combinations of the first, second, third, and fourth voltages may be evaluated to find a combination that makes the desired connection.

Prior to performing a 4D search, a search protocol may be defined. The search protocol may include an angular step size for each of the four axes, which may be the same or different for each axis. The search protocol may also include definition of one or more search domains. In this context, a "domain" is a set of points in four-dimensional space over which a search will be conducted. Each search domain may have a respective extent, which is to say the number of angular steps that will be taken along each of the four axes during the search. Multiple search domains of differing extent may be defined, such as, for example, a small search domain to be used initially with the hope of quickly establishing a connection and one or more larger search domains to be used if the search over the smaller search domain is not successful. The search protocol may also include one or more search patterns or orders in which the points within the search domains will be attempted.

A 4D search may try or evaluate all of the points within a search domain, and then select the point that provided the best result against one or more criteria. For example, a 4D search for a connection in an optical circuit switch may measure the insertion loss for each point (i.e. each combination of mirror drive voltages or angles) and then select the point with the lowest insertion loss. Alternatively, a 4D search for a connection in an optical circuit switch may measure the insertion loss for a series of points but stop searching when a point with "good enough" insertion loss (i.e. insertion loss less than or equal to a predetermined threshold) is achieved.

Figure 6:
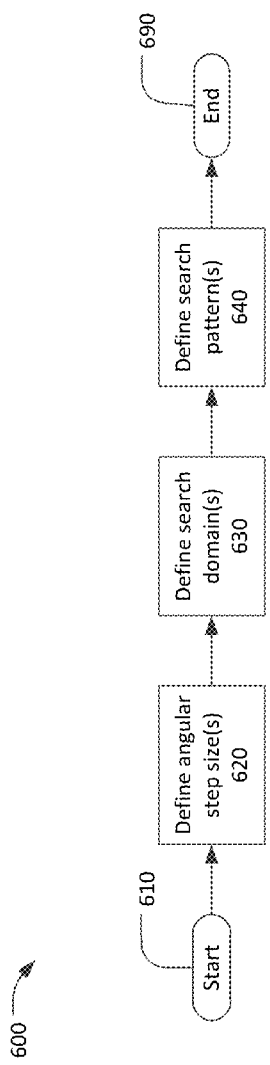
FIG. 6 is a flow chart of a process for defining a search protocol.

FIG. 6 is a flow chart of an exemplary process 600 for defining a search protocol. The process 600 may start at 610 when the requirements for and design of a particular optical circuit switch are known. The process may end at 690 when all of the parameters of a search protocol have been defined. The actions at 620, 630, and 640 may be performed in some other order.

At 620, an angular step size may be defined for each of the four axes (two axes for each of two mirror elements). The angular step sizes are critical elements of a 4D search protocol. With an excessively small step size, a 4D search may require an inordinate number of steps to find a connection. With an excessively large steps size, the search may inadvertently "step over" or miss the connection. Note that a 4D search does not have to find an optimum connection—the 4D search only needs to find mirror element drive voltages that result in a connection that is "close enough" to be optimized at 425 in the process 400. To this end, a 4D search only needs to find mirror element drive voltages that result in a true connection with an output power level sufficiently above a noise floor of the output optical power meter. The optimum step size may depend on the diameter of the optical beams, the surface area and spacing of the mirror elements in the mirror arrays, and the sensitivity of the output optical power meter. The optimum step size may be defined based upon an analysis of the optical system of the optical circuit switch.

Figure 7:
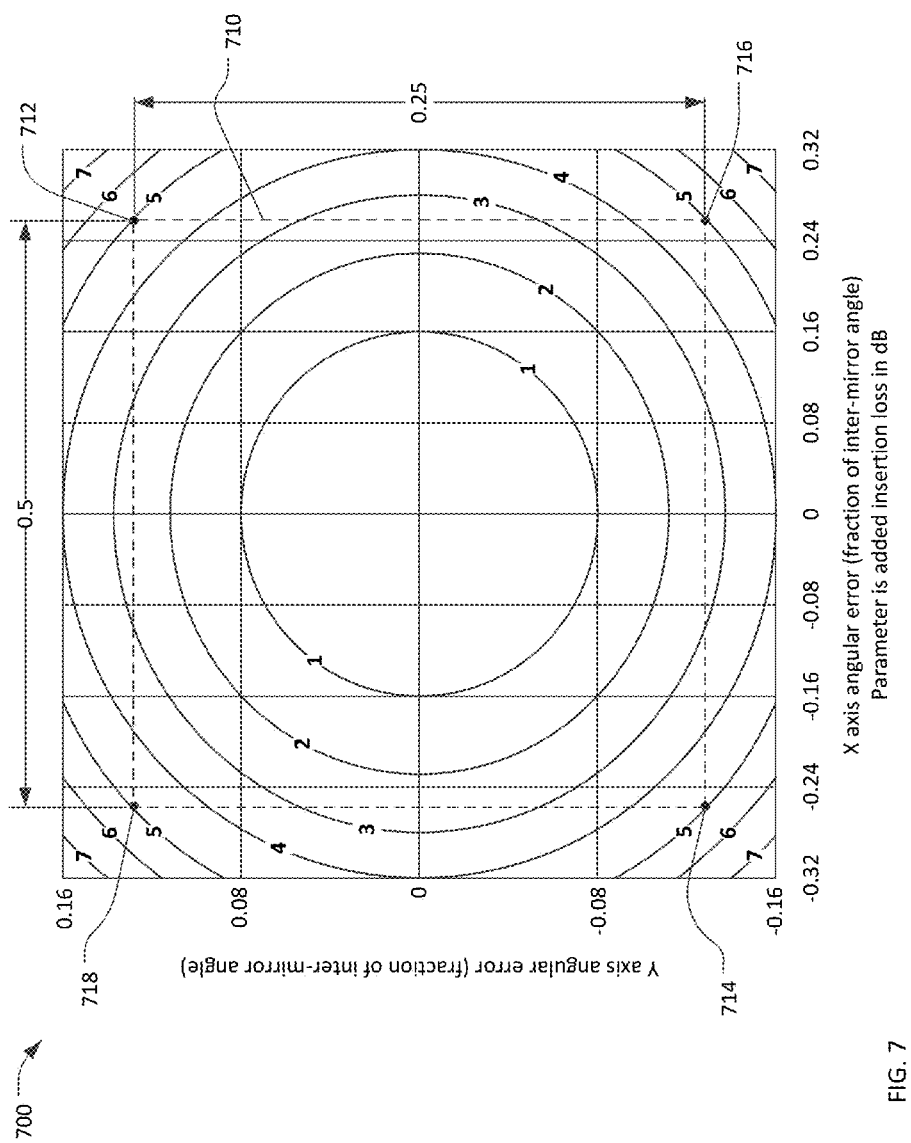
FIG. 7 is a graph of insertion loss versus beam angular error for an exemplary optical circuit switch.

Referring now to FIG. 7, a chart 700 shows added insertion loss as a function of x-axis and y-axis mirror angular errors for an input mirror element within a particular optical circuit switch, with the assumption that the alignment of the output mirror element is perfect. In this context "added insertion loss" is insertion loss in addition to the expected insertion loss of the other elements of an optical circuit switch (e.g. losses due to input and output tap couplers, reflection losses, etc.). The near-circular shapes in the chart 700 are contours of equal added insertion loss. The respective added insertion loss is given by a parameter superimposed over each contour. The mirror element angular errors are expressed as fractions of the respective inter-mirror angles, which may not be the same for the x-axis and the y-axis.

The chart 700 is an example based upon a particular design for an input mirror array and an output mirror array and a particular optical design. Further, the chart 700 was generated using the assumption that the optical beam reflected from the input mirror element has a Gaussian profile and a particular beam waist diameter. A graph such as the chart 700 may be generated, for example, by modeling the optical system of FIG. 5 using an optical modeling software tool and causing the software tool to systematically vary the rotation angles of the input and output mirror elements. A graph similar to the chart 700 may be generated for any optical circuit switch, but the relationship between added insertion loss and mirror angular errors may be significantly different from that shown in the chart 700. Graphs such as the chart 700 may be used to select an angular step size for each axis of a 4D search.

An angular step size may be selected from the chart 700 given a maximum allowable insertion loss that can be attributed to the angular errors of a single mirror. For the purpose of explanation, assume that the optimization process 425 can optimize a connection so long as the initial added insertion loss is less than or equal to 10 dB. In this case, the maximum added assertion loss that can be attributed to each of the two mirror elements is 5 dB. This assumption is exemplary, and a different optical circuit switch may be able to optimize connections stating with higher or lower added insertion loss.

In FIG. 7, a dashed rectangle 710 defines a suitable search step size of 0.5 (relative to the x axis inter-mirror angle) on the x axis and 0.25 (relative to the y axis inter-mirror angle) on the y axis. The corner points 712, 714, 716, 718 of the rectangle 710 represent combinations of mirror angular errors that result in just less than 5 dB insertion loss. Importantly, if the rectangle 710 is shifted in any direction with respect to the chart 700, the insertion loss for at least one of the corner points will decrease to less than 5 dB. At least one of the corner points 712, 714, 716, 718 will have less than 5 dB insertion loss for any possible alignment of the rectangle 710 on the chart 700. Thus a 4D search performed by stepping the input mirror element by 0.5 inter-mirror angle on the x axis and 0.25 inter-mirror angle on the y axis will not "step over" a connection having less that 5 dB insertion loss. A similar graph may be generated for the output mirror element and angular step sizes for the output mirror element may be similarly defined.

Figure 8:
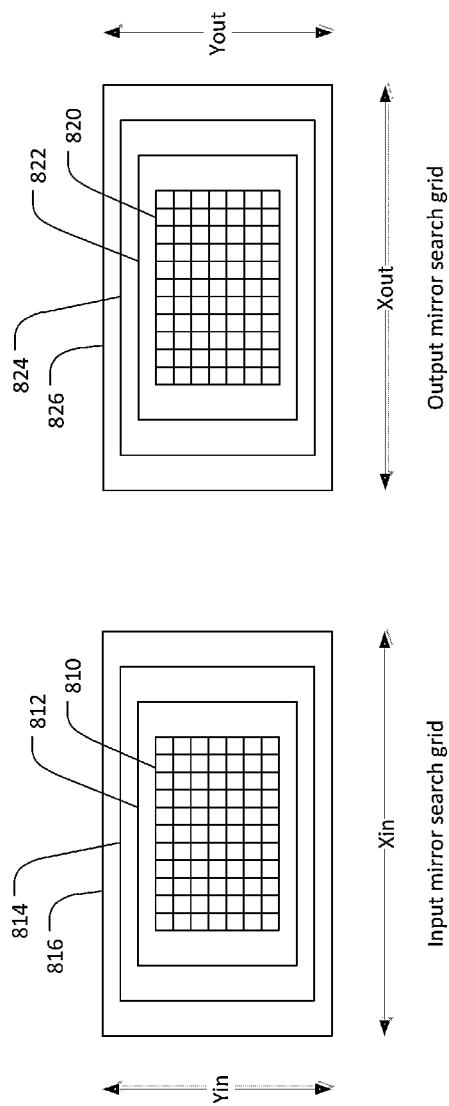
FIG. 8 is a graphical representation of exemplary search domains.

Referring back to FIG. 6, the extent of one or more search domains may be defined at 630. The extent of each search domain may be defined as a range of angle or a number of points on each of the four axes. For ease of visualization, a search domain may be depicted, as shown in FIG. 8, as a two-dimensional grid of angular positions for the input (first) mirror element and a two-dimensional grid of angular positions of the output (second) mirror element. For example, the two dimensional input mirror element search grid 810 contains 7×11=77 combinations of angular positions for the input mirror element. Similarly, the two dimensional output mirror element search grid 820 contains 7×11=77 combinations of angular positions for the output mirror element. These two search grids define a search domain in which each possible point in the input search grid is paired with each possible point in the output search grid, for a total of 5,929 points in the search domain. An input or output search grid may have more or fewer than 7×11 points, the input and output search grids may not necessarily be the same.

As previously described, more than one search domain may be defined at 630. For example, small search domain defined by 7×11 point input and output mirror search grids 810-820 may be searched first to attempt to quickly find the connection. One or more larger search domains 812-822, 814-824, 816-826 may be defined and searched if a search of a smaller search domain was not successful. Larger search domains include more points and thus take longer to search. Additionally, when searching a larger search domain after searching a smaller search domain, it may be necessary to search only the new points (i.e. points not included in the smaller search domain). The table in FIG. 8 defines the extent of the search domains and the number of new points (i.e. points not included in the next smaller search domain) in each search domain.

Returning to FIG. 6, one or more search domains may be defined at 630 based on known or anticipated error distribution for the input and output mirror elements. For example, if the input and output mirror elements are susceptible to larger angular errors on one axis than the other axis, the extent of a search domain may be greater along the axis with larger errors. For further example, if the simultaneous presence of large angular errors on both the x-axis and the y-axis is very improbable, a search domain may be defined with a cruciform shape with arms extending along both axes. Conversely, if the angular errors on the x-axis and the y-axis are not independent, such that a large error on one axis increases the probability of a large error on the other axis a search domain may be defined with a cruciform shape with arms extending at 45 degree angles to the axes.

After one or more search domains are defined at 630, one or more search patterns may be defined at 640. In this context, a "search pattern" defines the order in which the points within a search domain will be tried. A search pattern may be an ordered list of the points with a search domain, or an algorithm that determines an order in which the points within the domain will be tried.

Figure 9:
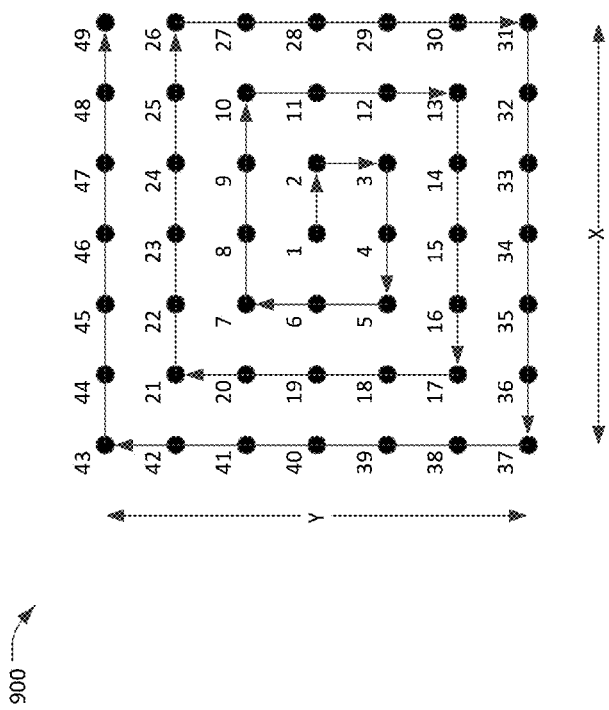
FIG. 9 is a graphical representation of an exemplary search pattern.

When angular errors on the four axes are random and independent, the point that produces the lowest insertion loss is more like to be near the center of the search domain than at an extreme of the search domain. In this case, a spiral search pattern proceeding from the center of the search domain outward may minimize the search time require to arrive at a "good enough" point. FIG. 9 shows an exemplary spiral search pattern 900 for a 7×7 element grid. The search pattern 900 may define, for example, the order in which the angles on the two rotation axes of the input mirror are varied during a search. A second search grid, which may be the same or different, may define the order in which the angles of the output mirror are varied. For example, the output mirror may be set to a first point and the input mirror may stepped from point 1 to point 49 in the order shown in the search pattern 900. The output mirror may then be set to a second point and the input mirror may stepped from point 1 to point 49 in the order shown in the search pattern 900 (or from point 49 to point 1 in reverse order). In this manner all 49 points in the search pattern 900 may be tried with all of the points in the output mirror search grid until a point is found with "good enough" insertion loss.

FIG. 10 defines, in tabular form, a double spiral search pattern for a 3×3×3×3 4D search domain. The 4D search domain may be represented graphically by a 3×3 input grid 1010 representing 9 possible angular positions of an input mirror element and a 3×3 output grid 1020 representing 9 possible positions of an output mirror element. The 4D search starts with the first point in both the input and output grids. Subsequently, a new point is added to either the input or output grid. Each time a new point is selected, all combination of the new point and all previously added points in the other of the input or output search grid. Examination of the table shows that each step in the 4D search requires moving only one of the input and output mirror elements. Further each step requires a mirror element to move only the distance between adjacent points in the corresponding grid. The search pattern of FIG. 10 can be scaled to arbitrarily large search spaces.

Figure 11:
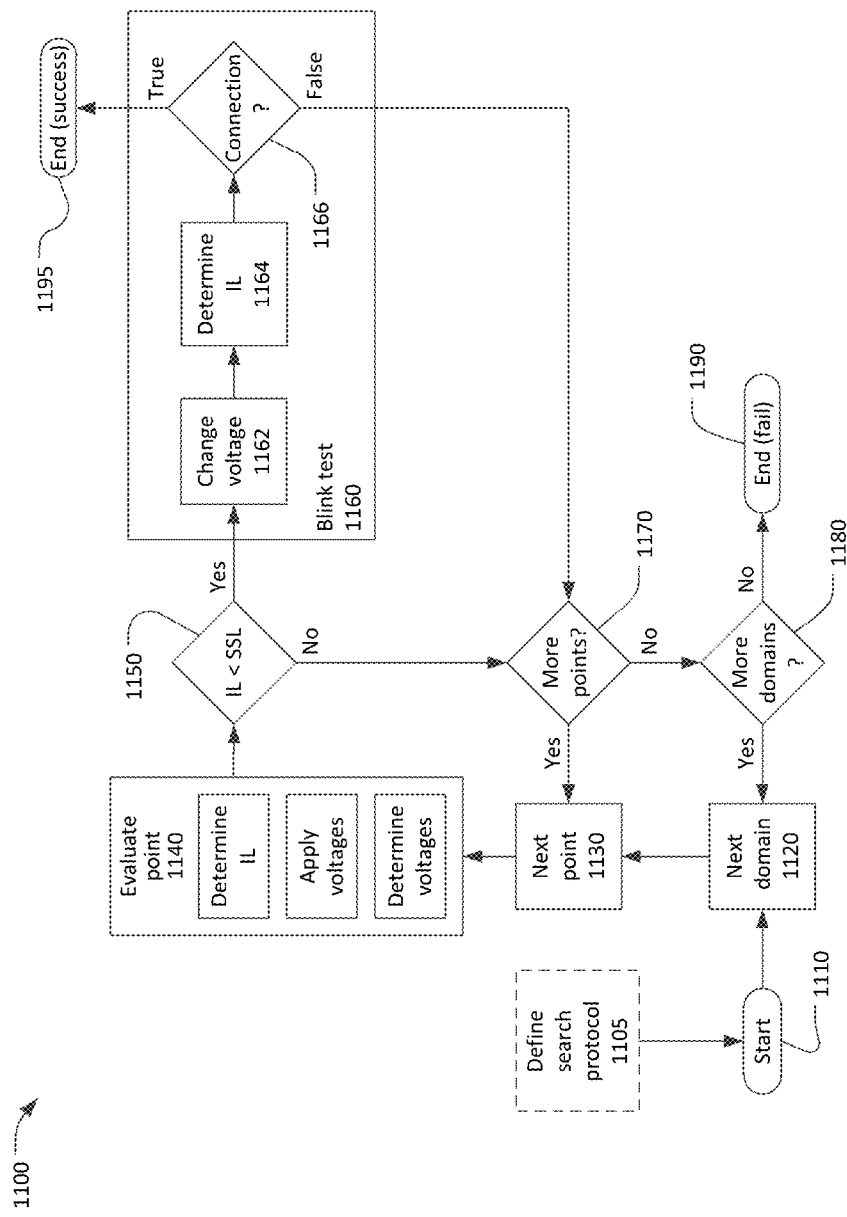
FIG. 11 is a flow chart of a process for searching for a connection through an optical circuit switch.

Referring now to FIG. 11, a process 1100 for performing a 4D search may be suitable for use at 430 in the process 400. The process 1100 may start at 1110, after an attempt to make a connection through an optical circuit switch has been unsuccessful. When the process 1100 succeeds in making a connection, the process may end at 1195. When a connection cannot be made, the process 1100 may end in failure at 1190. In either case, the process 400 may continue after the process 1100 has ended.

The process 1100 may be performed in accordance with a search protocol, which may be defined using the process 600 of FIG. 6. The search protocol may define, for example, one or more search domains, a step size between search points along each of the four axes, and one or more search patterns. At 1120 a search domain may be selected. If the search protocol only defines a single search domain, that domain may be selected at 1120 by default. When a search protocol defines more than one search domain, a smallest domain may be initially selected at 1120. If a connection is not found within the smallest domain, one or more progressively larger domains may be selected at 1120 during subsequent iterations of the process.

At 1130, a point within the search domain may be selected. For example, the initial point selected may be at the center of the search domain (i.e. at the center of the extent of the search along each of the four axes). Some other initial point may be selected. A different point within the search domain may be selected during each repetition of the actions 1130-1170. Points within the search domain may be selected in the order specified by a search pattern defined at 1105.

After a point within the search domain is selected, the point may be evaluated at 1140. The search domain selected at 1120 and the associated search grid may be conveniently defined in terms of angular positions for the input and output mirror elements. To evaluate a point, the corresponding angular positions may be converted into particular voltage values (i.e. particular voltage values for the first, second, third, and fourth voltages described in conjunction with FIG. 5) to be applied to electrodes coupled to the input mirror element and the output mirror element. For example, a mirror calibration table, such as the mirror calibration table 324, may list a set of nominal voltages to make each possible connection through the optical circuit switch and a search voltage step size for each of the first through fourth voltages. The particular voltages corresponding to a search point may be determined in some other manner.

The particular voltages may then be applied to the first through fourth electrodes and the insertion loss of the connection may be determined at 1140. A brief delay (not shown) may be provided between changing the applied voltages and determining the insertion loss to allow the mirror elements to settle in position. The insertion loss may be determined at 1140, for example, using an input optical power meter to measure input optical power at the input side of the connection and an output optical power meter to measure output optical power at the output side of the connection. The insertion loss may be determined as the ratio of the output optical power to the input optical power. The input and output optical power may commonly be expressed in dBm, in which case the insertion loss may be determined as the input optical power minus the output optical power (in which case insertion loss is a positive number).

At 1150, the insertion loss determined at 1140 may be compared to a predetermined stop-search-loss (SSL) threshold. Continuing the example of FIG. 7, SSL may be, for example, 10 dB. SSL may be larger or smaller than 10 dB. In general, setting a smaller SSL value may dictate a smaller search step size on some or all of the search axes. Setting a larger SSL value may dictate a larger search step size on some or all of the search axes.

When a determination is made at 1150 that the insertion loss of the connection is greater than SSL ("no" at 1150), the process 1100 may proceed to 1170. At 1170, a determination may be made whether or not there are additional points to try within the search domain. When there are more points available ("yes" at 1170), another point may be selected at 1130 and the actions from 1130-1170 may be repeated until either a tentative connection is found (i.e. a point is found with insertion loss less than SSL at 1150) or all points within the search domain have been tried.

When a determination is made at 1170 that all points within a search domain have been tried ("no" at 1170), a determination may be made at 1180 whether or not one or more additional search domains were defined at 1105. If a determination is made that there is another domain to search ("yes" at 1180), the process 1100 may return to 1120 to select a new search domain. The actions from 1120 to 1180 may be repeated until either a tentative connection is found (i.e. a point is found with insertion loss less than SSL at 1150) or all points within all search domains have been tried.

When a determination is made at 1180 that all points within all search domains have been attempted without finding a connection, the process 1100 may end in failure at 1190.

When a determination is made at 1150 that the insertion loss of the connection is less than SSL ("yes" at 1150), a blink test may be performed at 1160. As previously described, a false connection may occasionally occur between an output port and an incorrect input port. In this case, light from the incorrect input port is reflected by a corresponding input mirror element different from the input mirror element associated with the correct input port. To detect a false connection, the correct input mirror element may be deflected from its last position at 1162 by changing one or both of the first and second voltages. The insertion loss of the connection may be determined at 1164. The input mirror element may then be returned to its last position (not shown). The actions at 1162 and 1164 may be repeated two or more times. A determination may then be made at 1166 if the connection is a true connection or a false connection. If the connection is a true connection, the insertion loss measured at 1164 will change in response to the changed voltage at 1162. If the connection is a false connection, the insertion loss measured at 1164 will not change in response to the changed voltage at 1162.

When a determination is made at 1166 that the connection is a true connection, the process 1100 may end in success at 1195. When a determination is made at 1166 that the connection is a false connection, the process 1100 may return to 1170 to continue to search for a true connection.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. An optical circuit switch, comprising:
   a first port associated with a first mirror element, the first mirror element rotatable about orthogonal axes in response to first and second voltages applied respectively to first and second electrodes coupled to the first mirror element;
   a second port associated with a second mirror element, the second mirror element rotatable about orthogonal axes in response to third and fourth voltages applied respectively to third and fourth electrodes coupled to the second mirror element; and
   a controller that, upon receipt of a command to make a connection between the first port and the second port, performs actions comprising:
   applying nominal values for the first, second, third, and fourth voltages respectively to the to the first, second, third, and fourth electrodes to make an optical connection from the first port to the second port,
   determining an initial insertion loss for the optical connection,
   if the initial insertion loss is less than or equal to a predetermined threshold, conducting four independent single-dimension searches to determine values for the first, second, third, and fourth voltages that minimize the insertion loss, and
   when the initial insertion loss is greater than the predetermined threshold, conducting a four-dimensional search to determine values for the first, second, third, and fourth voltages that reduce the insertion loss to less than or equal to the predetermined threshold.

2. The optical circuit switch of claim 1, wherein the actions performed by the controller further comprise:
   after conducting the four-dimensional search to determine values for the first, second, third, and fourth voltages that reduce the insertion loss to less than or equal to the predetermined threshold, conducting four independent single-dimension searches to determine values for the first, second, third, and fourth voltages that minimize the insertion loss.

3. The optical circuit switch of claim 1, wherein the actions performed by the controller further comprise:
   after conducting the four-dimensional search to determine values for the first, second, third, and fourth voltages that reduce the insertion loss to less than or equal to the predetermined threshold, conducting a blink test to determine whether or not the connection is a true connection.

4. The optical circuit switch of claim 3, wherein the actions performed by the controller further comprise:
   when a determination is made that the connection is not a true connection, resuming the four-dimensional search.

5. The optical circuit switch of claim 3, wherein the actions performed by the controller further comprise:
   when a determination is made that the connection is a true connection, conducting four independent single-dimension searches to determine the values for the first, second, third, and fourth voltages that minimize the insertion loss.

6. The optical circuit switch of claim 3, wherein the controller conducting the blink test further comprises:
   changing at least one of the first voltage and the second voltage;
   determining that the connection is a true connection when the insertion loss changes in response to the changed voltage; and
   determining that the connection is not a true connection when the insertion loss does not change in response to the changed voltage.

7. The optical circuit switch of claim 1, wherein the controller conducting a four-dimensional search further comprises:
   selecting a first search domain from one or more predetermined search domains, each search domain including a plurality of search points, each search point corresponding to particular values for the first, second, third, and fourth voltages;
   sequentially selecting search points within the first search domain in accordance with a predetermined search pattern;
   evaluating each selected search point, by applying the corresponding particular values of the first, second, third, and fourth voltages respectively to the first, second, third, and fourth electrodes and determining the insertion loss of the connection; and
   terminating the four-dimensional search if a selected search point results in the insertion loss being less than or equal to the predetermined threshold.

8. The optical circuit switch of claim 7, wherein the controller conducting a four-dimensional search further comprises:

when all search points within the first search domain have been evaluated without finding a search point that results in the insertion loss being less than or equal to the predetermined threshold, selecting a second search domain and sequentially evaluating search points within the second search domain.

9. The optical circuit switch of claim 1, wherein
the first port is one of a plurality of input ports and the first mirror element is one of a plurality of input mirror elements, each input port uniquely associated with a respective one of the input mirror elements,
the second port is one of a plurality of output ports and the second mirror element is one of a plurality of output mirror elements, each output port uniquely associated with a respective one of the output mirror elements, and
the actions performed by the controller further comprise applying respective voltages to respective electrodes coupled to some input mirror elements in addition to the first mirror element and some output mirror elements in addition to the second mirror element to make optical connections between the associated input ports and output ports.

10. A method for making a connection from a first port to a second port in an optical circuit switch, comprising:
applying first and second voltages respectively to first and second electrodes coupled to a first mirror element associated with the first port, the first and second voltages applied at respective nominal voltage values;
applying third and fourth baseline voltages respectively to third and fourth electrodes coupled to a second mirror element associated with the second port, the third and fourth voltages applied at respective nominal voltage values;
determining an initial insertion loss for the optical connection;
if the initial insertion loss is less than or equal to a predetermined threshold, conducting four independent single-dimension searches to determine values for the first, second, third, and fourth voltages that minimize the insertion loss; and
when the initial insertion loss is greater than the predetermined threshold, conducting a four-dimensional search to determine values for the first, second, third, and fourth voltages that reduce the insertion loss to less than or equal to the predetermined threshold.

11. The method of claim 10, further comprising:
after conducting the four-dimensional search to determine values for the first, second, third, and fourth voltages that reduce the insertion loss to less than or equal to the predetermined threshold, conducting four independent single-dimension searches to determine values for the first, second, third, and fourth voltages that minimize the insertion loss.

12. The method of claim 10, further comprising:
after conducting the four-dimensional search to determine values for the first, second, third, and fourth voltages that reduce the insertion loss to less than or equal to the predetermined threshold, conducting a blink test to determine whether or not the connection is a true connection.

13. The method of claim 12, further comprising:
when a determination is made that the connection is not a true connection, resuming conducting the four-dimensional search.

14. The method of claim 12, further comprising:
when a determination is made that the connection is a true connection, conducting four independent single-dimension searches to determine values for the first, second, third, and fourth voltages that minimize the insertion loss.

15. The method of claim 12, wherein conducting the blink test further comprises:
changing at least one of the first voltage and the second voltage;
determining that the connection is a true connection when the insertion loss changes in response to the changed voltage; and
determining that the connection is not a true connection when the insertion loss does not change in response to the changed voltage.

16. The method of claim 10, wherein conducting a four-dimensional search further comprises:
selecting a first search domain from one or more predetermined search domains, each search domain including a plurality of search points, each search point corresponding to particular values for the first, second, third, and fourth voltages;
sequentially selecting search points within the first search domain in accordance with a predetermined search pattern;
evaluating each selected search point, by applying the corresponding particular values of the first, second, third and fourth voltages respectively to the first, second, third, and fourth electrodes and determining the insertion loss of the connection; and
terminating the four-dimensional search if a selected search point results in the insertion loss being less than or equal to the predetermined threshold.

17. The method of claim 16, wherein conducting a four-dimensional search further comprises:
when all search points within the first search domain have been evaluated without finding a search point that results in the insertion being less than or equal to the predetermined threshold, selecting a second search domain and sequentially evaluating the points within the second search domain.

18. The method of claim 10, wherein
the first port is one of a plurality of input ports and the first mirror element is one of a plurality of input mirror elements, each input port uniquely associated with a respective one of the input mirror elements,
the second port is one of a plurality of output ports and the second mirror element is one of a plurality of output mirror elements, each output port uniquely associated with a respective one of the output mirror elements, and
the method further comprises applying respective voltages to respective electrodes coupled to at least some input mirror elements in addition to the first mirror element and at least some output mirror elements in addition to the second mirror element to make optical connections between the associated input ports and output ports.

* * * * *